US009075466B2

(12) United States Patent
Lin et al.

(10) Patent No.: US 9,075,466 B2
(45) Date of Patent: Jul. 7, 2015

(54) TOUCH PANEL WITH SINGLE ELECTRODE LAYER

(71) Applicant: GIANTPLUS TECHNOLOGY CO., LTD., Toufen, Miao-Li County (TW)

(72) Inventors: Wei-Ting Lin, Toufen (TW); Po-Hsien Wang, Toufen (TW)

(73) Assignee: Giantplus Technology Co., Ltd., Toufen, Miao-Li (TW)

(*) Notice: Subject to any disclaimer, the term of this patent is extended or adjusted under 35 U.S.C. 154(b) by 152 days.

(21) Appl. No.: 13/842,026

(22) Filed: Mar. 15, 2013

(65) Prior Publication Data

US 2014/0092036 A1    Apr. 3, 2014

(30) Foreign Application Priority Data

Oct. 3, 2012    (TW) .............................. 101136609 A

(51) Int. Cl.
*G06F 3/041* (2006.01)

(52) U.S. Cl.
CPC .............. *G06F 3/041* (2013.01); *G06F 3/0412* (2013.01); *G06F 2203/04103* (2013.01)

(58) Field of Classification Search
CPC ..... G06F 3/041; G06F 3/0412; G06F 3/0416; G06F 3/044; G06F 3/045; G06F 3/046; G06F 3/047; G06F 2203/04103; G06F 2203/04111

USPC ...................................... 345/173, 174; 349/12
See application file for complete search history.

(56) References Cited

U.S. PATENT DOCUMENTS

| 6,305,073 B1 * | 10/2001 | Badders, Jr. ..................... 29/622 |
| 2008/0238706 A1 * | 10/2008 | Kenwright ................. 340/686.6 |
| 2012/0098767 A1 * | 4/2012 | Takai et al. .................... 345/173 |
| 2012/0204657 A1 * | 8/2012 | Suzuki et al. ............. 73/862.68 |
| 2013/0169589 A1 * | 7/2013 | Suzuki et al. ................. 345/174 |
| 2013/0201150 A1 * | 8/2013 | Suzuki et al. ................. 345/174 |

* cited by examiner

*Primary Examiner* — Tom Sheng
(74) *Attorney, Agent, or Firm* — Muncy, Geissler, Olds & Lowe, P.C.

(57) ABSTRACT

The invention provides a touch panel with a single electrode layer, which has a plurality of sensing channels. Each of the sensing channels includes a plurality of first transmission lines, a second transmission line and a plurality of first and second sensing electrodes on a substrate. The routing path of the first and second transmission lines routed on the substrate is non-straight. And, the first sensing electrodes and the second sensing electrodes include a plurality of first holes and second holes, respectively. The second sensing electrodes and the first sensing electrodes are disposed on the same side of the substrate. The geometric shapes of the first holes and the second holes correspond to the geometric shapes of the routing path of the first transmission lines and the second transmission line routed on the substrate. Thereby, the display quality can be improved by the touch panel of the present invention.

20 Claims, 8 Drawing Sheets

TOUCH PANEL WITH SINGLE ELECTRODE LAYER

FIELD OF THE INVENTION

The present invention relates generally to a touch panel with a single electrode layer, and particularly to a touch panel with a single electrode layer that has a plurality of transmission lines with non-straight path.

BACKGROUND OF THE INVENTION

The touch panel technology progresses day by day. At present, the fabrication technology of touch panel is developing for being compatible with and integrated to the process of thin film transistor LCD (TFT LCD). In the form of a touch display module, the manufacturing cost and the thickness of touch panel can be reduced. The structures and processes of single-sided ITO (SITO), double-sided ITO (DITO), glass/film/film (GFF), or on glass sensor (OGS) according to the prior art are not compatible with the standard process of TFT LCD according to the prior art. This is because it is required to form an indium tin oxide (ITO) film or attach an ITO thin film material on one side of double sides of an extra glass or on a cover glass in the SITO, DITO, or GFF structures for routing the transmitting and receiving signals. Nonetheless, the method of using an extra glass for forming the conductive film or attaching the thin film material increases the overall thickness and weight of the touch display module. Besides, the pasting between two glasses or between a glass and a conductive thin film is required, which will reduce the yield of the touch display module and increase process complexity.

Thereby, for overcoming the technical problems described above, developers have developed the touch panel technology with a single electrode layer. The ITO film is formed on the other side of the cover filter glass. After the processes of lithography and etching, the routing of transmitting and receiving signals is completed simultaneously. Accordingly, the touch panel technology with a single electrode layer can reduce the risk of yield loss and the manufacturing costs.

Nonetheless, a general touch panel technology has much routing for transmitting and receiving signals. Likewise, the touch panel technology with a single electrode layer faces the same scenario. Consequently, for a general 5-inch touch panel with a single electrode layer, 352 wires are required for transmitting signals. Because the routing of the transmission lines is straight and there are as many as 352 wires for transmitting signals, when the touch panel is placed on the display panel for displaying, the problem of pattern visibility occurs. In other words, when a user views the image displayed on the display panel at certain angles, many stripes appear. In addition, 352 wires of transmitting signals need to be connected to the control integrated circuit (IC). The tremendous amount of wires greatly increase the area of the layout for the flexible printed circuit board connecting to the outside, and hence increasing difficulty in integrating the touch display module and a mobile device.

Accordingly, the present invention improves the design of the touch panel with a single electrode layer according to the prior art and solves the problems of pattern visibility and thickness.

SUMMARY

An objective of the present invention is to provide a touch panel with a single electrode layer. The present invention has non-straight routing for transmission lines. Thereby, the problem of pattern visibility in a touch panel with a single electrode layer is solved.

Another objective of the present invention is to provide a touch panel with a single electrode layer. By using a plurality of holes, the displaying performance of the touch panel is enhanced.

Still another objective of the present invention is to provide a touch panel with a single electrode layer. The present invention uses a plurality of conductive points for reducing the area and thickness of the flexible printed circuit board of the touch panel with a single electrode layer.

Still another objective of the present invention is to provide a touch panel with a single electrode layer. The present invention disposes the control chip and a plurality of sensing channels on the same substrate for reducing the number of transmission lines exiting the substrate. Thereby, the power consumption and the manufacturing costs of the touch panel are reduced.

For achieving the objectives described above, the touch panel with a single electrode layer according to the present invention has a substrate with a plurality of sensing channels disposed thereon. Each of the plurality of sensing channels comprises a plurality of first transmission lines, a plurality of first sensing electrodes, a plurality of second sensing electrodes, and a second transmission line. The plurality of first transmission lines are disposed on the substrate and their routing is non-straight. The plurality of first sensing electrodes are disposed on the substrate and include a plurality of first holes. The plurality of first sensing electrodes are coupled to the plurality of first transmission lines, respectively. The plurality of second sensing electrodes and the plurality of first sensing electrodes are located on the same side of the substrate and the plurality of second sensing electrodes include a plurality of second holes. The second transmission line is disposed on the substrate and its routing is non-straight. Besides, the second transmission line is coupled to the plurality of second sensing electrodes. The geometric shapes of the plurality of first holes correspond to the geometric shapes of the routing of the plurality of first transmission lines on the substrate; the geometric shapes of the plurality of second holes correspond to the geometric shapes of the routing of the second transmission line on the substrate. Thereby, the present can solve the problem of pattern visibility in a touch panel with a single electrode layer and improve its displaying performance.

The touch panel with a single electrode layer according to the present invention further comprises a flexible printed circuit board, which is disposed on one side of the substrate and comprises a plurality of first connecting lines and a second connecting line. The plurality of first connecting lines and the second connecting line have a plurality of first conductive points and a second conductive point exposed, respectively, for connecting electrically to the plurality of first transmission lines and the second transmission line. Thereby, the present invention can reduce the area and thickness of the flexible printed circuit board of the touch panel with a single electrode layer according to the present invention.

The touch panel with a single electrode layer according to the present invention further comprises a control chip connected to the plurality of first connecting lines and the second connecting line and disposed on the flexible printed circuit board. Thereby, by disposing the control chip on the flexible printed circuit board, the number of transmission lines exiting the substrate is reduced, and thus reducing the power consumption and the manufacturing costs of the touch panel.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
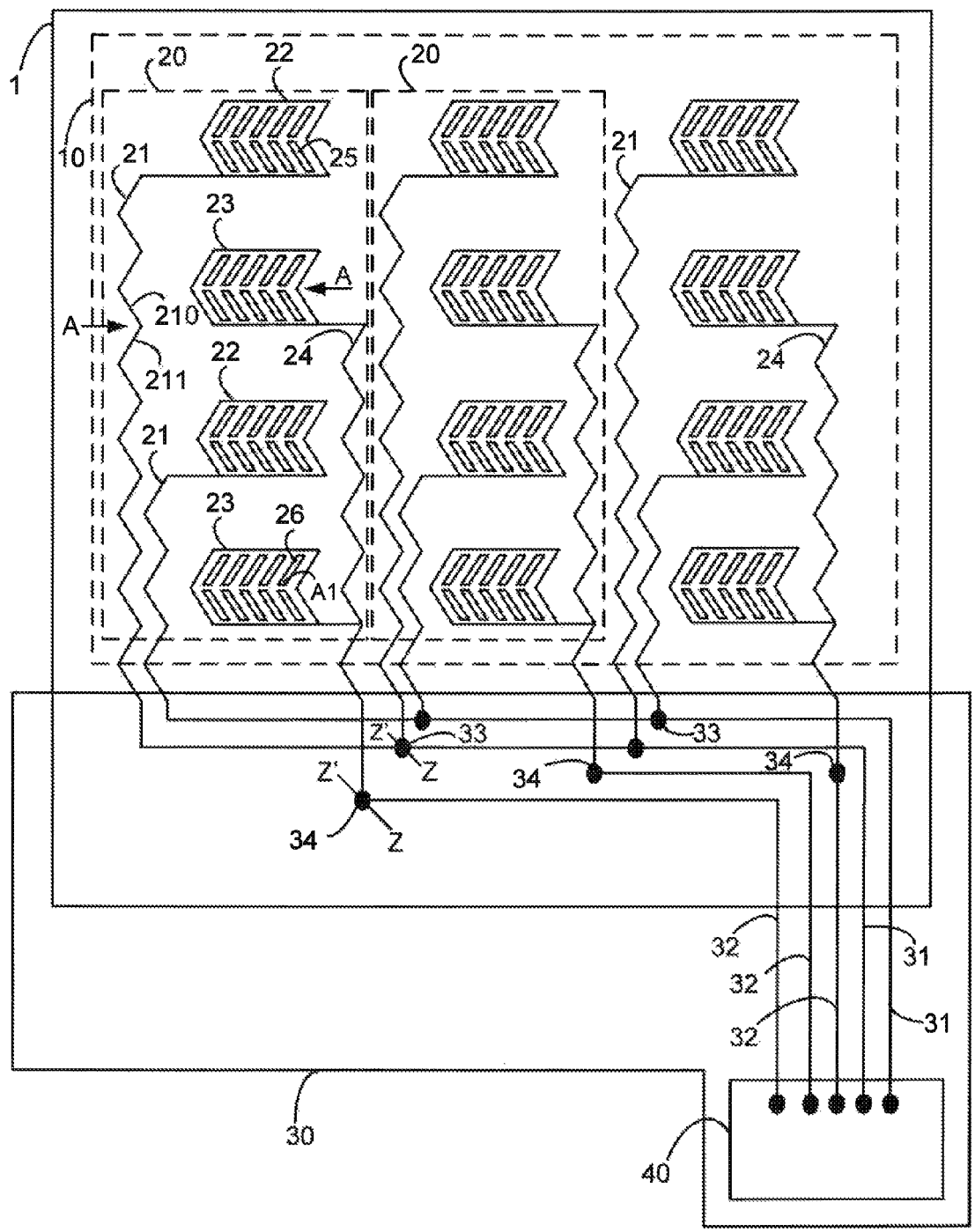
FIG. 1 shows a schematic diagram of the touch panel with a single electrode layer according to an embodiment of the present invention.

FIG. 1 shows a schematic diagram of the touch panel with a single electrode layer according to an embodiment of the present invention. As shown in the figure, the touch panel with a single electrode layer according to the present invention has a substrate 1 with a plurality of sensing channels 20 disposed thereon. Each of the plurality of sensing channels 20 comprises a plurality of first transmission lines 21, a plurality of first sensing electrodes 22, a plurality of second sensing electrodes 23, and a second transmission line 24. The plurality of first transmission lines 21 are disposed on the substrate 1 and their routing is non-straight. The plurality of first sensing electrodes 22 are disposed on the substrate 1 and include a plurality of first holes 25. The plurality of first sensing electrodes 22 are coupled to the plurality of first transmission lines 21, respectively. The plurality of second sensing electrodes 23 and the plurality of first sensing electrodes 22 are located on the same side of the substrate 1 and the plurality of second sensing electrodes 23 include a plurality of second holes 26. The second transmission line 24 is disposed on the substrate 1 and its routing is non-straight. Besides, the second transmission line 24 is coupled to the plurality of second sensing electrodes 23. The geometric shapes of the plurality of first holes 25 correspond to the geometric shapes of the routing of the plurality of first transmission lines 21 on the substrate 1; the geometric shapes of the plurality of second holes 26 correspond to the geometric shapes of the routing of the second transmission line 24 on the substrate 1.

Refer again to FIG. 1. In the embodiment, three sensing channels 20 are depicted. One of the sensing channels 20 will be used as an example. The plurality of first transmission lines 21 and the second transmission line 24 of the sensing channel 20 are wired in a different way from normal routing. They are routed on the substrate 1 in a non-straight pattern. According to the present embodiment, the routing is zigzag. Each first transmission line 21 and each second transmission line 24 have a plurality of zigzag lines 210, 211. The even zigzag lines 210 are symmetrical to the odd zigzag lines 211. The angle between an even zigzag line 210 and an odd zigzag line 211 is A. According to the present embodiment, the angle A is 90 to 150 degrees. Preferably, the angle A is 100 to 130 degrees. Thereby, the paths of the plurality of first transmission lines 21 on the substrate 1 and to the plurality of first sensing electrodes 22 are non-straight; the paths of the second transmission line 24 on the substrate 1 and to the second sensing electrode 23 are non-straight.

In addition, the wires of the plurality of first transmission lines 21 for transmitting signals to the plurality of first sensing electrodes 22 are receiving electrodes (Rx) of the touch panel; the wires of the plurality of second transmission lines 24 for outputting the signals of the plurality of second sensing electrodes 23 are transmitting electrodes (Tx) of the touch panel. Nonetheless, according to the present invention, the plurality of first transmission lines 21 are not limited to the receiving electrodes Rx and the plurality of second transmission lines 24 are not limited to the transmitting electrodes Tx. The plurality of first transmission lines 21 can be designed as the transmitting electrodes Tx, and the plurality of second transmission lines 24 can be designed as the receiving electrodes Rx.

Besides, because the plurality of first transmission lines 21 and the second transmission line 24 are normally wired straight, the problem of pattern visibility occurs in the viewable area 10 of the touch panel with a single electrode layer. On the contrary, the plurality of first transmission lines 21 and the second transmission line 24 are zigzag wired in the viewable area 10. Thereby, the problem of pattern visibility for users can be solved. Furthermore, the plurality of first transmission lines 21 and the second transmission line 24 according to the present embodiment are zigzag wired in the viewable area 10 only; outside the viewable area 10, the routing can be non-zigzag. However, if the designer thinks the zigzag routing should be extended to the area outside the viewable area 10, the plurality of first transmission lines 21 and the second transmission line 24 can be zigzag wired outside the viewable area 10. Accordingly, the present embodiment does not limit the design area of the plurality of first transmission lines 21 and the second transmission line 24.

Because the plurality of first transmission lines 21 and the second transmission line 24 according to the present invention are zigzag wired with the angle A, the shapes of the plurality of first sensing electrodes 22 and the plurality of second sensing electrodes 23 are different from the rectangular electrodes in general touch panels. In addition, corresponding to the routing of the plurality of first transmission lines 21 and the second transmission line 24, the plurality of first sensing electrodes 22 and the plurality of second sensing electrodes 23 have the angle A. The angle A of the shape of the plurality of first sensing electrodes 22 and the plurality of second sensing electrodes 23 is also 90 to 150 degrees. Preferably, the angle is also 100 to 130 degrees. The plurality of first sensing electrodes 22 include the plurality of first holes 25; the plurality of second sensing electrodes 23 include the plurality of second holes 26. Because the plurality of first transmission lines 21 and the second transmission line 24 are non-straight with the angle A, the geometric shapes of the plurality of first holes 25 of the plurality of first sensing electrodes 22 and the plurality of second holes 26 of the second sensing electrodes 23 correspond to the geometric shapes of the paths of the plurality of first transmission lines 21 and the second transmission line 24 on the substrate 1, as shown in FIG. 1.

Moreover, the geometric shapes of the plurality of first holes 25 and the plurality of second holes 26 are similar to the plurality of first sensing electrodes 22 and the plurality of second sensing electrodes 23 with the angle A. For matching the routing of the plurality of first transmission lines 21 and the second transmission line 24, the geometric shapes of the plurality of first holes 25 and the plurality of second holes 26 will be modified to sloped rectangles with the angle A1, as shown in FIG. 1. In the present embodiment, the plurality of first holes 25 and the plurality of second holes 26 are parallelograms with the angle A1 equal to a half of the angle A of the plurality of first sensing electrodes 22 and the plurality, of second sensing electrodes 23. Thereby, in FIG. 1, the geometric shape of the plurality of first holes 25 corresponds to that of the plurality of first sensing electrodes 22; the geometric shape of the plurality of second holes 26 corresponds to that of the plurality of second sensing electrodes 23. In other words, the geometric shape of the plurality of first holes 25 corresponds to the geometric shape of the routing path of the plurality of first transmission lines 21 on the substrate 1; the geometric shape of the plurality of second holes 26 corresponds to the geometric shape of the routing path of the second transmission line 24 on the substrate 1. The angle A1 of the plurality of first holes 25 and the plurality of second holes 26 is equal to a half of the angle A of the plurality of first transmission lines 21 and the second transmission line 24.

Figure 2:
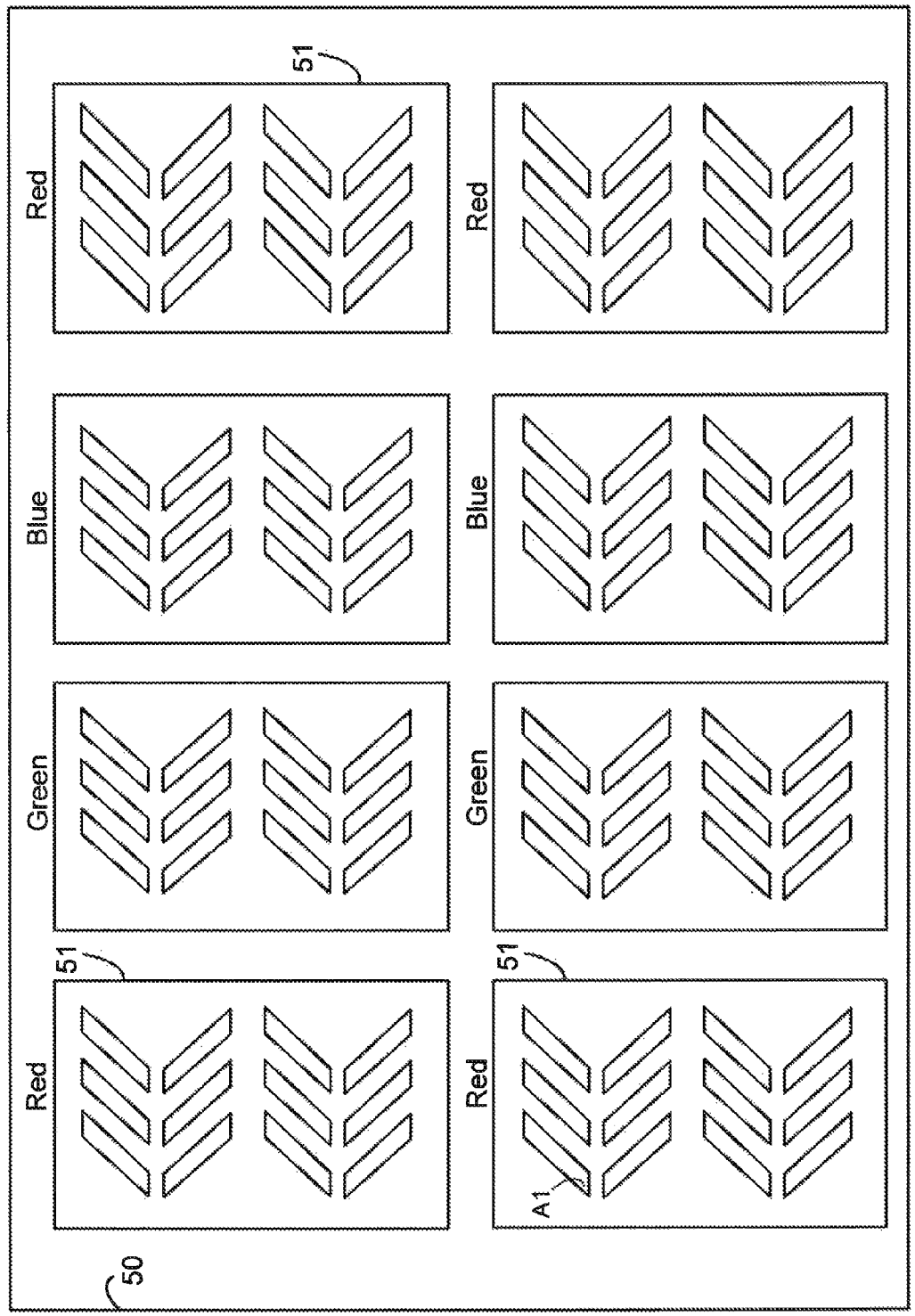
FIG. 2 shows a schematic diagram of the black matrix layer of the color filter according to an embodiment of the present invention.

Refer to FIG. 1 and FIG. 2. FIG. 2 shows a schematic diagram of the black matrix layer of the color filter according to an embodiment of the present invention. As shown in the figure, a black matrix layer 50 has a plurality of light pervious areas 51. The color photoresist of the three primary colors (red, green, blue) is disposed on the light pervious area 51. After the backlight of an LCD passes through the light pervious area 51, the light emerges after passing the touch panel with a single electrode layer. Thereby, the black matrix layer 50 is disposed on one side of the substrate 1, while the plurality of first sensing electrodes 22, the plurality of second sensing electrodes 23, the plurality of first transmission lines 21, and the second transmission line 24 of the touch panel with a single electrode layer are disposed on the other side of the substrate 1, respectively, and on the locations where the plurality of light pervious areas 51 correspond to the black matrix layer 50. Namely, the plurality of first sensing electrodes 22, the plurality of second sensing electrodes 23, the plurality of first transmission lines 21, and the second transmission line 24 are disposed on the side of the substrate 1 different from the side for the color filter.

Furthermore, because the geometric shapes of the plurality of first sensing electrodes 22 and the plurality of second sensing electrodes 23 of the touch panel with a single electrode layer according to the present invention correspond to the angle A of the plurality of first transmission lines 21 and the second transmission line 24, light can emerge uniformly. By means of the sheltering of the plurality of first sensing electrodes 22 and the plurality of second sensing electrodes 23, the geometric shapes of the plurality of light pervious areas 51 correspond to the geometric shapes of the plurality of first sensing electrode 22 and the plurality of second sensing electrode 23. Thereby, the geometric shapes of the plurality of light pervious areas 51 are the same as the geometric shapes of the plurality of first holes 25 and the plurality of second holes 26. In other words, the angle A1 of the geometric shapes of the plurality of light pervious areas 51 is the same as the angle A1 of the geometric shapes of the plurality of first holes 25 and the plurality of second holes 26. Likewise, the angle A1 of the plurality of light pervious areas 51 is equal to a half of the angle A of the plurality of first transmission lines and the second transmission line 24.

Accordingly, by corresponding the plurality of holes 25 of the plurality of first sensing electrodes 22 and the plurality of second holes 26 of the plurality of second sensing electrodes 23 to the light pervious area 51 of the black matrix layer 50, the shapes of the sheltered regions in the plurality of light pervious areas 51 corresponds to the geometric shapes of the plurality of first transmission lines 21, the plurality of first sensing electrodes 22, the plurality of second sensing electrodes 23, and the plurality of second transmission lines 24. Hence, the geometric shapes of the light pervious regions in each of the light pervious areas 51 on the black matrix layer 50 are identical; light can thereby emerge uniformly and thus improving the problem of pattern visibility in a touch panel with a single electrode layer. Besides, the present invention does not limit the sheltered area on the black matrix layer 50 by the plurality of first sensing electrodes 22 and the plurality of second sensing electrodes 23. That is to say, one first sensing electrode 22 can shelter two or more light pervious areas 51 at one time. For example, one first sensing electrode 22 can shelter the red light pervious area 51 and the green light pervious area 51 at the same time. Thereby, the embodiment according to the present invention emphasizes that, for improving the displaying performance, the shapes of the light pervious areas 51 correspond to the geometric shapes of the first and second sensing electrodes 22, 23. The sheltered region on the black matrix layer 50 by the plurality of first and second sensing electrode 22, 23 is not emphasized by the present embodiment.

Figure 3:
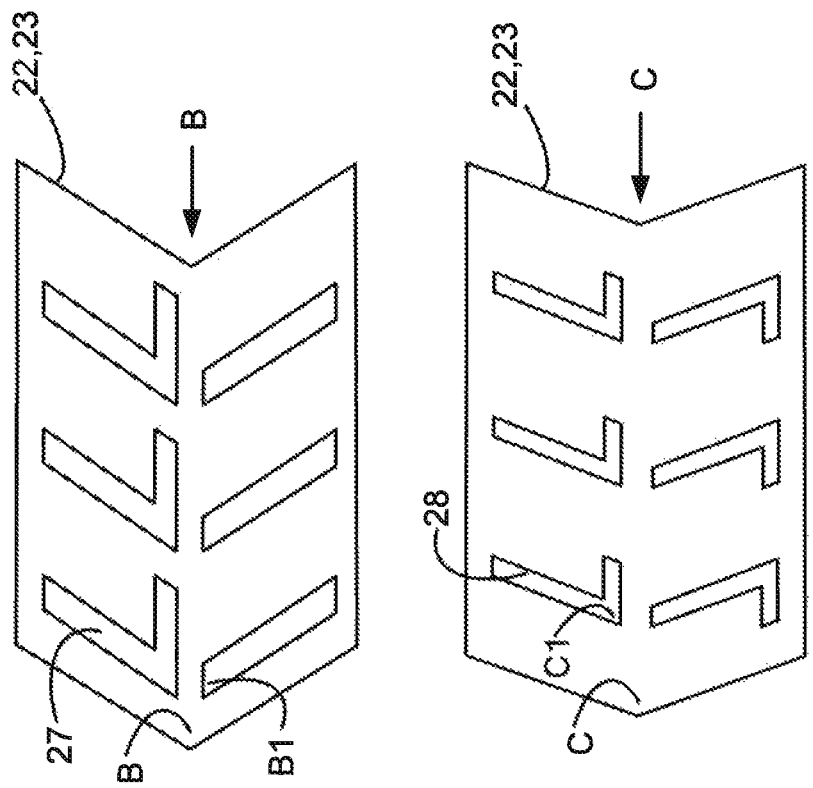
FIG. 3 shows schematic diagrams of the first sensing electrode and the second sensing electrode with different angles and geometric shapes according to an embodiment of the present invention.

FIG. 3 shows schematic diagrams of the first sensing electrode and the second sensing electrode with different angles and geometric shapes according to an embodiment of the present invention. As shown in the figure, the angle A of the plurality of first and second sensing electrodes 22, 23 can be the angle B or the angle C. In addition, the plurality of first holes 25 of the plurality of first sensing electrodes 22 and the plurality of second holes 26 of the plurality of second sensing electrodes 23 can be appropriately modified to a plurality of holes 27 or a plurality of holes 28. In other words, the angle A1 of the plurality of first and second holes 25, 26 can be modified to the angle B1 or the angle C1. Thereby, the present invention does not limit the angle A of the plurality of first and second sensing electrodes 22, 23 to the angle A, the angle B, or the angle C. Likewise, the present invention does not limit the geometric shape or arrangement of the plurality of first and second holes 25, 26. The designer can modify the angle A of the plurality of first and second sensing electrodes 22, 23 and the angle A1 of the plurality of first and second holes 25, 26 according to the required displaying performance. Of course, the geometric shapes of the plurality of light pervious areas 51 on the black matrix layer 50 can exhibit different shapes by modifying the sheltering of the plurality of first and second sensing electrodes 22, 23. Besides, when the plurality of first and second sensing electrodes 22, 23 are modified from the angle A to the angle B or the angle C, the angle A1 of the geometric shape of the plurality of light pervious areas 51 is also change to the angle B1 or the angle C1.

Figure 4:
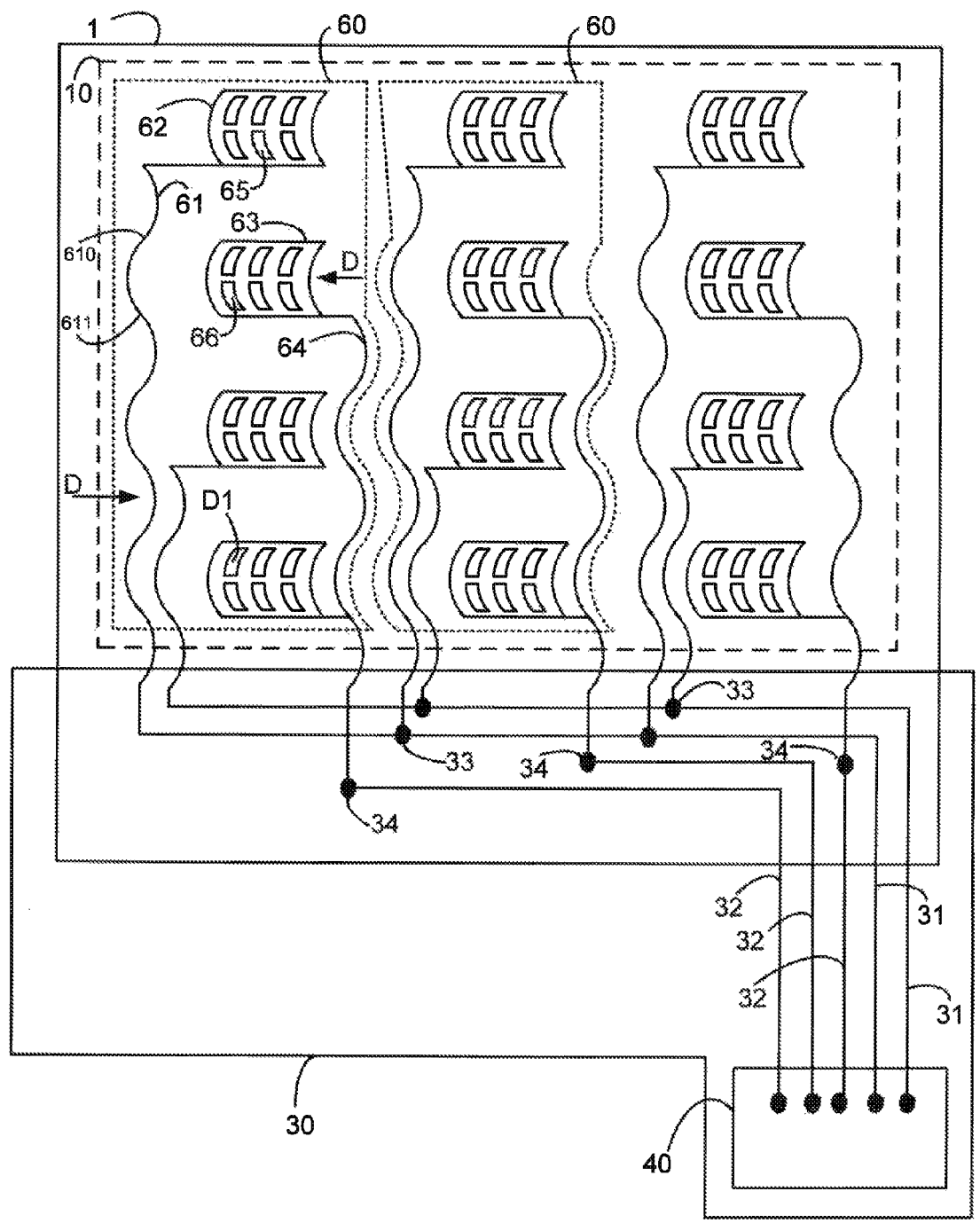
FIG. 4 shows a schematic diagram of the touch panel with a single electrode layer according to another embodiment of the present invention.

FIG. 4 shows a schematic diagram of the touch panel with a single electrode layer according to another embodiment of the present invention. As shown in the figure, a plurality of first transmission lines 61 and a second transmission line 64 according to the present invention can be curvedly ( 此用法是否適宜？請事務所確認) wired with a radian D. The plurality of first transmission lines 61 and the second transmission line 64 include a plurality of curves 610, 611. The plurality of even curves 610 are symmetrical to the plurality of odd curves 611. Thereby, the plurality of first and second sensing electrodes 62, 63 according to the present invention are different from the rectangular electrodes in general touch panels. Moreover, the routing corresponding to the plurality of first transmission lines 61 and the second transmission line 64 also has a radian D. The radian D of the plurality of first and second sensing electrodes 62, 63 is $0.5\pi$ to $0.83\pi$. Preferably, the radian D is $0.56\pi$ to $0.72\pi$. Likewise, for uniformly emerging the light through the touch panel with a single electrode layer, the plurality of first sensing electrodes 62 include a plurality of first holes 65 and the plurality of second sensing electrodes 63 include a plurality of second holes 66. Because the plurality of first transmission lines 61 and the second transmission line 64 are curvedly wired, the plurality of first holes 65 of the plurality of first sensing electrodes 62 and the plurality of second holes 66 of the plurality of second sensing electrodes 63 correspond to the geometric shapes of the routing of the plurality of first transmission lines 61 and the second transmission line 64 on the substrate 1, as shown in FIG. 4.

Similarly, the geometric shapes of the plurality of first and second holes 65, 66 are the same as the plurality of first and second sensing electrodes 62, 63 with the radian D. For matching the routing of the plurality of first transmission lines 61 and the second transmission line 64, the geometric shapes of the plurality of first and second holes 65, 66 will be modified to curved geometric shapes, as shown in FIG. 4. Thereby, in FIG. 4, the geometric shapes of the plurality of first holes 65 correspond to the geometric shapes of the plurality of first transmission lines 61 and the plurality of first sensing electrodes 62; the geometric shapes of the plurality of second holes 66 correspond to the geometric shapes of the second transmission line 64 and the plurality of second sensing electrodes 63. Namely, the geometric shapes of the plurality of first holes 65 correspond to the geometric shapes of the paths of the plurality of first transmission lines 61 on the substrate 1; the geometric shapes of the plurality of second holes 66 correspond to the geometric shapes of the paths of the second transmission line 64 on the substrate 1.

Furthermore, the paths of the plurality of first transmission lines 21, 61 and the plurality of second transmission lines 24, 64 on the substrate 1 are zigzag and curved. Nonetheless, the present invention is not limited to zigzag and curve. Once the routing path of the transmission lines on the substrate 1 is non-straight, it is still within the scope of the present invention.

Figure 5:
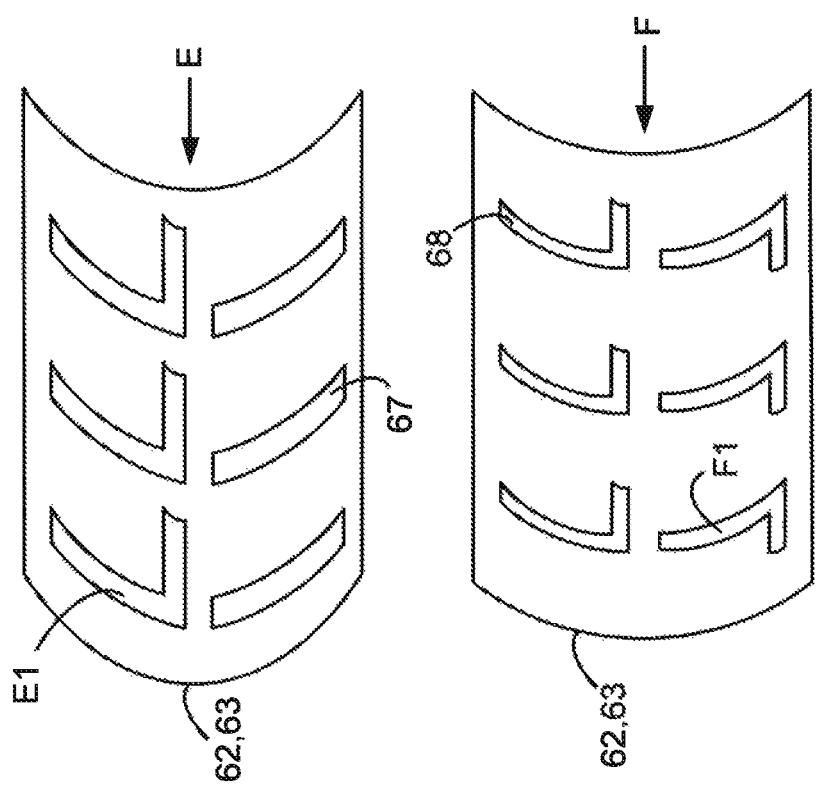
FIG. 5 shows schematic diagrams of the first sensing electrode and the second sensing electrode with different radians and geometric shapes according to an embodiment of the present invention.

FIG. 5 shows schematic diagrams of the first sensing electrode and the second sensing electrode with different radians and geometric shapes according to an embodiment of the present invention. As shown in the figure, the radian D of the plurality of first sensing electrodes 62 and the plurality of second sensing electrodes 63 according to the present invention can be modified to other radians such as the radian E or the radian F. Thereby, the present invention does not limit the radian D of the plurality of first and second sensing electrodes 62, 63 to the radian D, the radian E, or the radian F. Likewise, the present invention does not limit the geometric shapes or arrangements of the plurality of first and second holes 65, 66. In other words, the plurality of first and second holes 65, 66 can be modified to a plurality of holes 67 or a plurality of holes 68. The radian D1 of the plurality of first and second holes 65, 66 can be modified to the radian E1 or the radian F1. In addition, the designer can modify the radian of the plurality of first and second sensing electrodes 62, 63 and the radian D1 of the plurality of first and second holes 65, 66 according to the required displaying performance. Of course, after modifying the plurality of first and second sensing electrodes 62, 63, the geometric shapes shown on the plurality of light pervious areas 51 of the black matrix layer 50 will be different. Besides, when the radian D of the plurality of first and second sensing electrodes 62, 63 are modified to the radian E or the radian F, the radian D1 of the geometric shapes shown on the light pervious areas S1 will be changed to the radian E1 or the radian F1.

Figure 6:
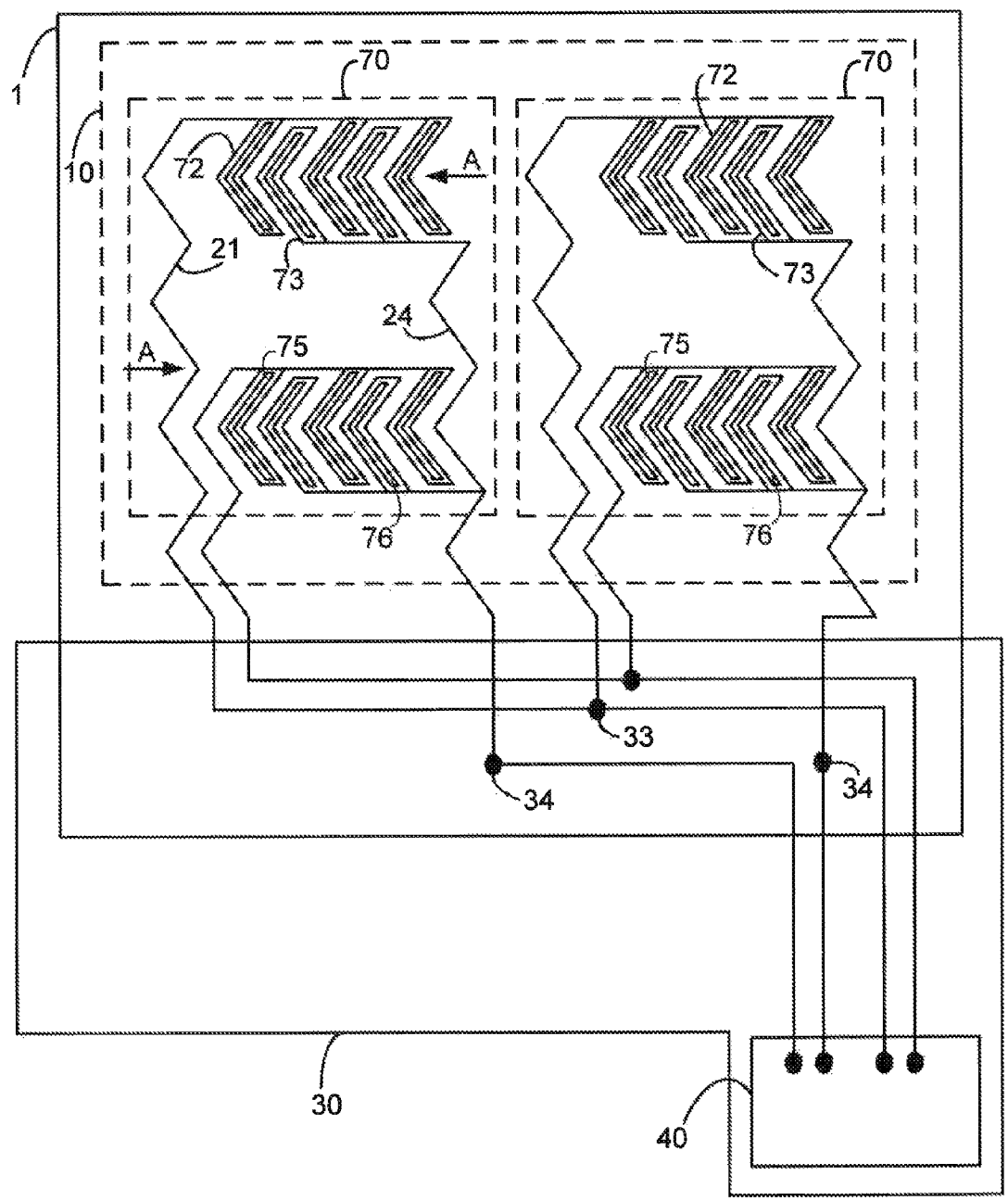
FIG. 6 shows schematic diagrams of the first sensing electrode and the second sensing electrode interlaced vertically according to an embodiment of the present invention.

FIG. 6 shows schematic diagrams of the first sensing electrode and the second sensing electrode interlaced vertically according to an embodiment of the present invention. As shown in the figure, a plurality of first sensing electrodes 72 and a plurality of second sensing electrode 73 can further be interlaced vertically. From left to right, the sequence will be the first sensing electrode 72-the second sensing electrode 73-the first sensing electrode 72-the second sensing electrode 73-the first sensing electrode 72. The plurality of first and second sensing electrodes 72, 73 form a touch unit. Thereby, in FIG. 6, the plurality of first and second sensing electrodes 72, 73 are clearly similar to the plurality of first and second sensing electrodes 22, 23 shown in FIG. 1 and are arranged interlacedly. The number and the geometric shape of the first and second sensing electrodes in each touch unit can be different in different embodiments. Moreover, for emerging light uniformly, the plurality of the first and second sensing electrodes 72, 73 have a plurality of first holes 75 and a plurality of second holes 76, respectively. The rest features have been described in detail in FIG. 1 and will not be described again. Furthermore, as shown in FIG. 6, the geometric shape of the plurality of first sensing electrodes 72 correspond to the geometric shape of the routing path of the plurality of first transmission lines 21 on the substrate 1; the geometric shape of the plurality of second sensing electrodes 73 correspond to the geometric shape of the routing path of the second transmission line 24 on the substrate 1.

In the embodiment of FIG. 6, the present invention does not limit the geometric shapes, the areas, and the arrangement of the plurality of first holes 75, the plurality of second holes 76, the plurality of first sensing electrodes 72, and the plurality of second sensing electrodes 73. The embodiments in the present invention are used for examples but not for limiting the design scope of the present invention. Nonetheless, the plurality of first sensing electrodes 72, the plurality of second sensing electrodes 73, the plurality of first holes 75, and the plurality of second holes 76 need to correspond to the geometric shapes of the routing path of the plurality of first transmission lines 21 and the second transmission line 24 on the substrate 1 for improving the drawback of pattern visibility in the touch panel with a single electrode layer according to the prior art.

Figure 7:
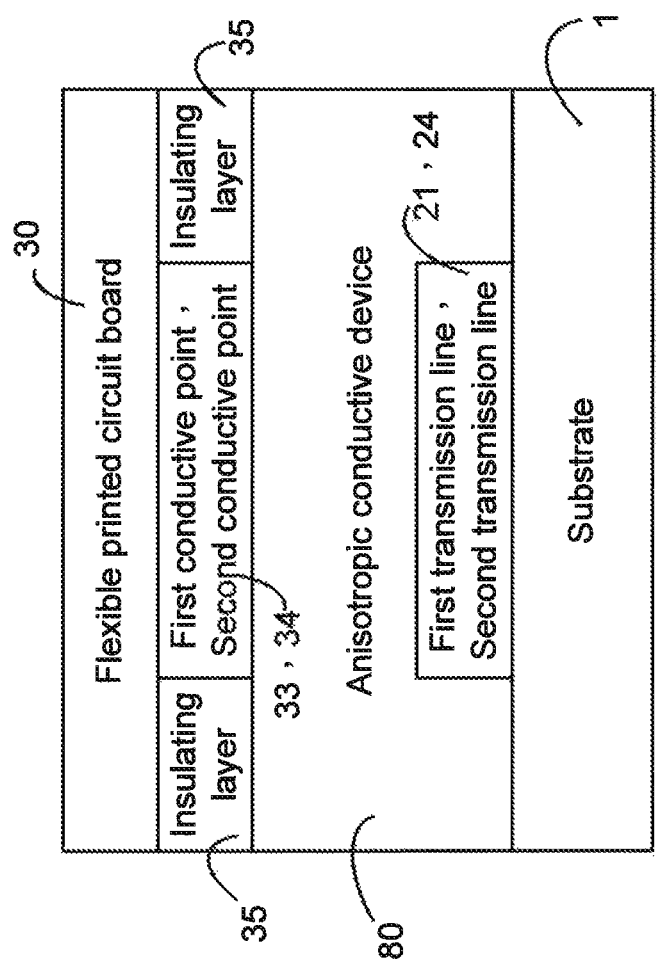
FIG. 7 shows a cross-sectional view along ZZ' in FIG. 1.

Please refer to FIG. 1 and FIG. 7. FIG. 7 shows a cross-sectional view along ZZ' in FIG. 1. The touch panel with a single electrode layer according to the present invention requires a flexible printed circuit board 30 for transmitting signals. As shown in FIG. 1, from top to bottom, the first transmission lines 21 on the same level in each sensing channel 20 are coupled to each other and then coupled to the flexible printed circuit board 30. The second transmission lines 24 in the sensing channels 20 are coupled to the flexible printed circuit board 30, respectively. The flexible printed circuit board 30 is disposed on one side of the substrate 1 and includes a plurality of first connecting lines 31 and a plurality of second connecting lines 32. The plurality of first and second connecting lines 31, 32 expose a plurality of first and second conductive points 33, 34, respectively, for connecting electrically to the plurality of first transmission lines 21 and the second transmission line 24 of each sensing channel 20, respectively. The plurality of first and second connecting lines 31, 32 are further connected to a control chip 40, as shown in FIG. 1. The control chip 40, the plurality of first connecting lines 31, and the plurality of second connecting lines 32 are disposed on the flexible printed circuit board 30.

The cross-sectional view along ZZ' in FIG. 7 shows a schematic diagram of the first and second transmission lines 21, 24 in the sensing channel 20 coupling to the first and second connecting lines 31, 32 of the flexible printed circuit board 30, respectively. From top to bottom, there are the flexible printed circuit board 30, the first conductive point 33, an insulating layer 35, an anisotropic conductive device 80, the first transmission line 21, and the substrate 1. However, the locations of the first conductive point 33 and the first transmission line 21 can be regarded as the second conductive point 34 and the second transmission line 24 as well. In addition, as shown in FIG. 1, by means of the plurality of first and second conductive points 33, 34, the six first transmission lines 21 and three second transmission lines 24 are connected to the control chip 40 through two first connecting lines 31 and three second connecting lines 32 only. Thereby, by using the plurality of first and second conductive points 33, 34, the routing area and thickness of the flexible printed circuit board 30 of the touch panel with a single electrode layer are reduced. The first conductive point 33 of the flexible printed circuit board 30 is coupled to the first transmission line 21 through the anisotropic conductive device 80 for reducing the routing area of the output signals of the sensing channels 20 and for further reducing the number of first and second transmission lines 21, 24 extending outside the substrate 1. Accordingly, the anisotropic conductive device 80 described above is used for adhering the plurality of first conductive points 33 to the plurality of first transmission lines 21 and the plurality of second conductive points 34 to the plurality of second transmission lines 24.

Figure 8:
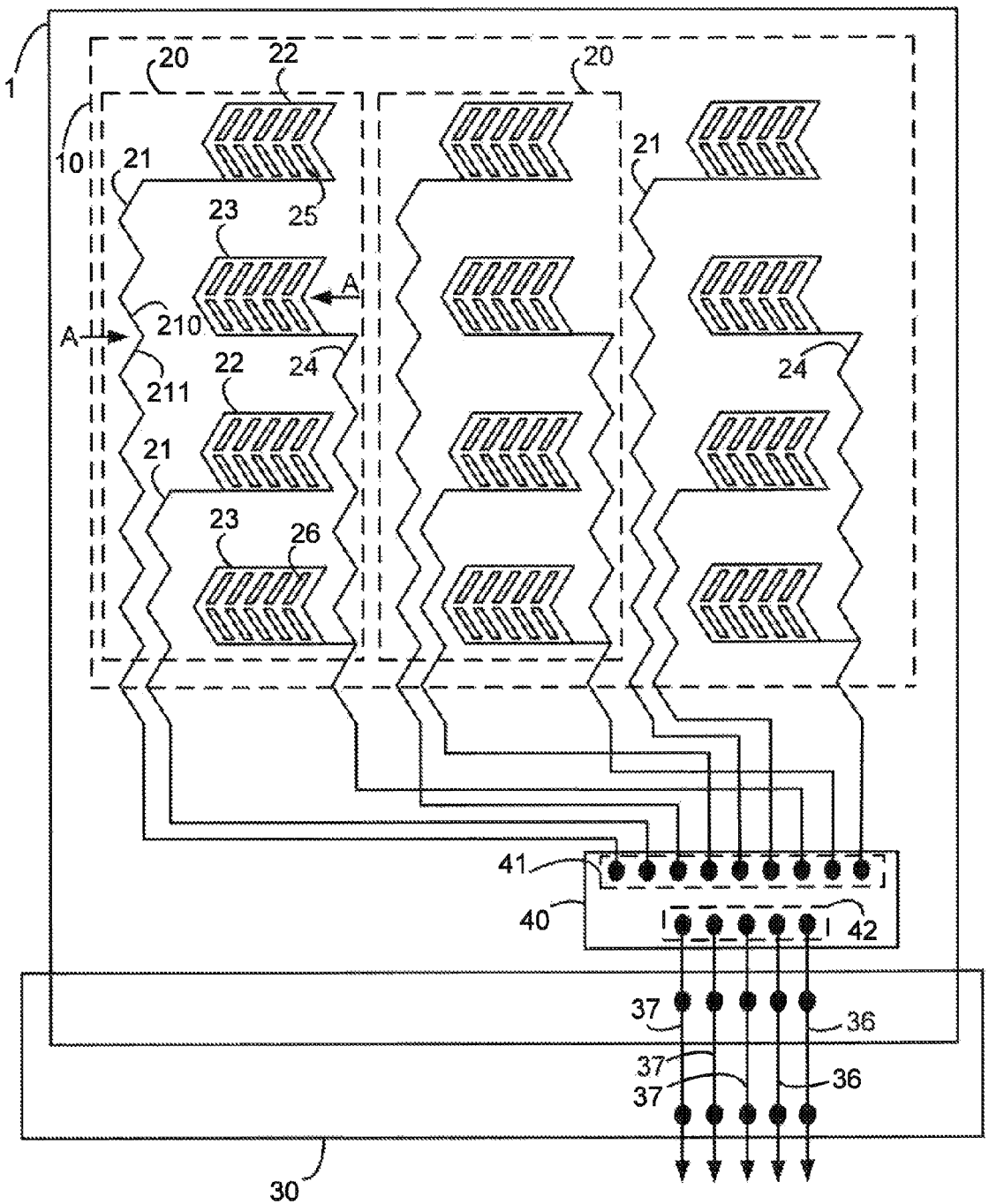
FIG. 8 shows a schematic diagram of the touch panel with a single electrode layer according to still another embodiment of the present invention.

FIG. 8 shows a schematic diagram of the touch panel with a single electrode layer according to still another embodiment of the present invention. As shown in the figure, the present invention can further dispose the control chip 40 and the plurality of sensing channels 20 on the same level of the substrate 1. In other words, after the plurality of first and second transmission lines 21, 24 of the plurality of sensing channels 20 are coupled to a plurality of inputs 41 of the control chip 40, respectively, a plurality of outputs 42 of the control chip 40 transmit signal to outside via a plurality of third and fourth connecting lines 36, 37 of the flexible printed circuit board 30. The thickness of the control chip 40 is limited to 75 to 150 µm. Thereby, the number of transmission lines exiting the substrate 1 from the sensing channels 20 of the touch panel with a single electrode layer according to the present invention is reduced and thus lowering the power consumption and the manufacturing costs of the touch panel. Besides, the embodiment in FIGS. 4 and 6 can also change the coupling between the plurality of sensing channels 20 and the control chip 40 to this design. The embodiment described above is only used for example; it is not used for limiting the design scope of the control chip 40.

To sum up, the touch panel with a single electrode layer according to the present invention has a substrate with a plurality of sensing channels disposed thereon. Each of the plurality of sensing channels comprises a plurality of first transmission lines, a plurality of first sensing electrodes, a plurality of second sensing electrodes, and a second transmission line. The plurality of first transmission lines are disposed on the substrate and their routing is non-straight. The plurality of first sensing electrodes are disposed on the substrate and include a plurality of first holes. The plurality of first sensing electrodes are coupled to the plurality of first transmission lines, respectively. The plurality of second sensing electrodes and the plurality of first sensing electrodes are located on the same side of the substrate and the plurality of second sensing electrodes include a plurality of second holes. The second transmission line is disposed on the substrate and its routing is non-straight. Besides, the second transmission line is coupled to the plurality of second sensing electrodes. The geometric shapes of the plurality of first holes correspond to the geometric shapes of the routing of the plurality of first transmission lines on the substrate; the geometric shapes of the plurality of second holes correspond to the geometric shapes of the routing of the second transmission line on the substrate. Thereby, the present can improves the design of the touch panel with a single electrode layer according to the prior art. The routing path of the transmission lines are non-straight, and thus solving the problem of pattern visibility in a touch panel with a single electrode layer. Besides, according to the present invention, the flexible printed circuit board is adhered to the transmission lines of the sensing channels with specially designed shapes but not using the contact pad according to the prior art. Alternatively, the control chip is disposed on the same substrate of the sensing channels. Thereby, the number of transmission lines exiting the substrate is reduced and hence reducing the area of the flexible printed circuit board required for transmitting to outside as well as enhancing the yield of adhering the flexible printed circuit board to the substrate.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A touch panel with a single electrode layer, having a substrate and a plurality of sensing channels on said substrate, and each of said plurality of sensing channels comprising:
   a plurality of first transmission lines, disposed on said substrate, and each routing path of said plurality of first transmission lines on said substrate is non-straight;
   a plurality of first sensing electrodes, disposed on said substrate, including a plurality of first holes, and coupled to said plurality of first transmission lines, respectively;
   a plurality of second sensing electrodes, including a plurality of second holes, located on the same side of said substrate with said plurality of first sensing electrodes; and
   a second transmission line, disposed on said substrate, the routing path of said second transmission line on said substrate is non-straight, and coupled to said plurality of second sensing electrodes;
   wherein the geometric shape of said plurality of first holes corresponds to the geometric shape of each routing path of said plurality of first transmission lines on said substrate, and the geometric shape of said plurality of second holes corresponds to the geometric shape of the routing path of said second transmission line on said substrate.

2. The touch panel with a single electrode layer of claim 1, wherein said plurality of first transmission lines and said second transmission line include a plurality of zigzag lines with said plurality of odd lines symmetrical to said plurality of even lines.

3. The touch panel with a single electrode layer of claim 2, wherein the angle between one of said plurality of odd lines and one of said plurality of even lines is 90 to 150 degrees.

4. The touch panel with a, single electrode layer of claim 3, wherein the angle between one of said plurality of odd lines and one of said plurality of even lines is 100 to 130 degrees.

5. The touch panel with a single electrode layer of claim 1, wherein said plurality of first transmission lines and said second transmission line include a plurality of curves with said plurality of odd curves symmetrical to said plurality of even curves.

6. The touch panel with a single electrode layer of claim 5, wherein the radian of said plurality of curves is $0.5\pi$ to $0.83\pi$.

7. The touch panel with a single electrode layer of claim 6, wherein the radian of said plurality of curves is $0.567\pi$ to $0.727\pi$.

8. The touch panel with a single electrode layer of claim 1, wherein the geometric shape of said plurality of first sensing electrodes corresponds to the geometric shape of each routing path of said plurality of first transmission lines on said substrate, and the geometric shape of said plurality of second sensing electrodes corresponds to the geometric shape of the routing path of said second transmission line on said substrate.

9. A touch panel with a single electrode layer, having a substrate and a plurality of sensing channels on said substrate, and each of said plurality of sensing channels comprising:
   a plurality of first transmission lines, disposed on said substrate, and each routing path of said plurality of first transmission lines on said substrate is non-straight;
   a plurality of first sensing electrodes, disposed on said substrate, including a plurality of first holes, and coupled to said plurality of first transmission lines, respectively;
   a plurality of second sensing electrodes, including a plurality of second holes, located on the same side of said substrate with said plurality of first sensing electrodes;
   a second transmission line, disposed on said substrate, the routing path of said second transmission line on said substrate is non-straight, and coupled to said plurality of second sensing electrodes; and
   a flexible printed circuit board, disposed on one side of said substrate, including a plurality of first connecting lines and a plurality of second connecting lines exposing a plurality of first conductive points and a plurality of second conductive points, respectively, for connecting electrically said plurality of first transmission lines and said second transmission line, respectively;
   wherein the geometric shape of said plurality of first holes corresponds to the geometric shape of each routing path of said plurality of first transmission lines on said substrate, and the geometric shape of said plurality of second holes corresponds to the geometric shape of the routing path of said second transmission line on said substrate.

10. The touch panel with a single electrode layer of claim 9, wherein the geometric shape of said plurality of first sensing electrodes corresponds to the geometric shape of each routing path of said plurality of first transmission lines on said substrate and the geometric shape of said plurality of second sensing electrodes corresponds to the geometric shape of the routing path of said second transmission line on said substrate.

11. The touch panel with a single electrode layer of claim 9, wherein said flexible printed circuit board further comprising:
   an anisotropic conductive device, used for adhering said plurality of first conductive points to said plurality of first transmission lines and said plurality of conducive points to said second transmission line, respectively.

12. The touch panel with a single electrode layer of claim 9, and further comprising:
   a control chip, disposed on said flexible printed circuit board with said plurality of first connecting lines and said plurality of second connecting lines.

13. The touch panel with a single electrode layer of claim 9, and further comprising:
   a control chip, coupled to said plurality of sensing channels and disposed on the same level of said plurality of sensing channels on said substrate.

14. A touch panel with a single electrode layer, having a substrate, a plurality of sensing channels and a control chip disposed on the same side of said substrate, said control chip coupled to said plurality of sensing channels and disposed on the same level of said plurality of sensing channels on said substrate, and each of said plurality of sensing channels comprising:
   a plurality of first transmission lines, disposed on said substrate, and each routing path of said plurality of first transmission lines on said substrate is non-straight;
   a plurality of first sensing electrodes, disposed on said substrate, including a plurality of first holes, and coupled to said plurality of first transmission lines, respectively;
   a plurality of second sensing electrodes, including a plurality of second holes, located on the same side of said substrate with said plurality of first sensing electrodes; and
   a second transmission line, disposed on said substrate, the routing path of said second transmission line on said substrate is non-straight, and coupled to said plurality of second sensing electrodes;
   wherein the geometric shape of said plurality of first holes corresponds to the geometric shape of each routing path of said plurality of first transmission lines on said substrate, and the geometric shape of said plurality of second holes corresponds to the geometric shape of the routing path of said second transmission line on said substrate.

15. The touch panel with a single electrode layer of claim 14, wherein said plurality of first transmission lines and said second transmission line include a plurality of zigzag lines with said plurality of odd lines symmetrical to said plurality of even lines.

16. The touch panel with a single electrode layer of claim 14, wherein said plurality of first transmission lines and said second transmission line include a plurality of curves with said plurality of odd curves symmetrical to said plurality of even curves.

17. The touch panel with a single electrode layer of claim 14, wherein the geometric shape of said plurality of first sensing electrodes corresponds to the geometric shape of each routing path of said plurality of first transmission lines on said substrate, and the geometric shape of said plurality of second sensing electrodes corresponds to the geometric shape of the routing path of said second transmission line on said substrate.

18. The touch panel with a single electrode layer of claim 14, wherein a color filter is disposed on the other side of said substrate.

19. The touch panel with a single electrode layer of claim 14, wherein said control chip comprising:
   a plurality of inputs, coupled to said plurality of first transmission lines and said second transmission line of said plurality of sensing channels; and
   a plurality of outputs, coupled to said plurality of inputs, and used for outputting an electrical status related to said plurality of sensing channels.

20. The touch panel with a single electrode layer of claim 14, wherein the thickness of said control chip is 75 to 150 μm.

* * * * *